United States Patent
Guo et al.

(10) Patent No.: US 9,779,117 B1
(45) Date of Patent: *Oct. 3, 2017

(54) DATABASE PARTITIONING SCHEME EVALUATION AND COMPARISON

(71) Applicant: EMC Corporation, Hopkinton, MA (US)

(72) Inventors: Xiaoyan Guo, Beijing (CN); Yu Cao, Beijing (CN); Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 250 days.

This patent is subject to a terminal disclaimer.

(21) Appl. No.: 14/501,531

(22) Filed: Sep. 30, 2014

(51) Int. Cl.
*G06F 7/00* (2006.01)
*G06F 17/00* (2006.01)
*G06F 17/30* (2006.01)
*H04L 29/08* (2006.01)

(52) U.S. Cl.
CPC ........ *G06F 17/30292* (2013.01); *H04L 67/10* (2013.01)

(58) Field of Classification Search
CPC ......... G06F 17/30554; G06F 17/30864; G06F 17/30873; G06F 17/30463; G06F 17/30474; G06F 17/30289; G06F 17/30958

See application file for complete search history.

(56) References Cited

U.S. PATENT DOCUMENTS

| 7,634,456 B2 * | 12/2009 | Yagoub | G06F 17/30306 |
| 9,031,994 B1 * | 5/2015 | Cao | G06F 17/30958 |
| | | | 707/798 |
| 9,244,976 B1 * | 1/2016 | Zhang | G06F 17/30442 |
| 2006/0036989 A1 * | 2/2006 | Chaudhuri | G06F 17/30312 |
| | | | 717/101 |
| 2007/0061289 A1 * | 3/2007 | Brown | G06F 11/3447 |
| 2007/0083500 A1 * | 4/2007 | Zibitsker | G06F 9/5083 |
| 2007/0234316 A1 * | 10/2007 | Bayerlein | G06F 8/71 |
| | | | 717/140 |
| 2007/0288495 A1 * | 12/2007 | Narasayya | G06F 17/30306 |

(Continued)

OTHER PUBLICATIONS

D. Dewitt et al., "Parallel Database Systems: The Future of High Performance Database Systems," Communications of the ACM, Jun. 1992, pp. 85-98, vol. 35, No. 6.

(Continued)

*Primary Examiner* — Susan Chen
(74) *Attorney, Agent, or Firm* — Ryan, Mason & Lewis, LLP

(57) ABSTRACT

A database benchmark configuration is selected via an interface. At least one database partitioning scheme from a plurality of database partitioning schemes is selected via the interface. The selected database partitioning scheme is configured through the interface. The selected database partitioning scheme is evaluated based on the configuring step and the selected database benchmark configuration, and evaluation results are generated. A presentation is generated for the interface based on at least a portion of the evaluation results, wherein the presentation is configured to provide at least an indication of a performance of the selected database partitioning scheme given the configuring step and the selected database benchmark configuration.

19 Claims, 4 Drawing Sheets

(56) References Cited

U.S. PATENT DOCUMENTS

| | | | | |
|---|---|---|---|---|
| 2011/0302583 A1* | 12/2011 | Abadi | ............... | G06F 17/30545 |
| | | | | 718/102 |
| 2014/0280373 A1* | 9/2014 | Raitto | ............... | G06F 17/30292 |
| | | | | 707/803 |
| 2015/0088844 A1* | 3/2015 | Stigsen | ............. | G06F 17/30312 |
| | | | | 707/703 |

OTHER PUBLICATIONS

G. Decandia et al., "Dynamo: Amazon's Highly Available Key-Value Store," Proceedings of the Twenty-First ACM SIGOPS Symposium on Operating Systems Principles (SOSP), Oct. 2007, pp. 205-220.

C. Curino et al., "Schism: A Workload-Driven Approach to Database Replication and Partitioning," Proceedings of the VLDB Endowment, Sep. 2010, pp. 48-57, vol. 3, No. 1.

Y.C. Tay et al., "UpSizeR: Synthetically Scaling an Empirical Relational Database," Technical Report TR12/10, The National University of Singapore, Dec. 2010, 13 pages.

S. Chaudhuri et al., "Compressing SQL Workloads," Proceedings of the ACM SIGMOD International Conference on Management of Data, Jun. 2002, pp. 488-499.

* cited by examiner

DATABASE PARTITIONING SCHEME EVALUATION AND COMPARISON

FIELD

The field relates to data processing, and more particularly to methodologies for evaluating and comparing database partitioning schemes.

BACKGROUND

Database partitioning (or sharding) has been used for improving performance and scalability for both transactional and analytical application programs (hereinafter "applications"). Most of the major database vendors, such as IBM, Oracle, Microsoft and Pivotal, have support for database partitioning. There already exist many kinds of general-purpose partitioning schemes, among which round-robin, range-based, and hashing are the most widely deployed. More ad-hoc and flexible partitioning schemes tailored for specific-purpose applications have also been developed, such as Schism and the consistent hashing of Dynamo. However, selecting the most suitable scheme for a given application program places a heavy burden on the database administrator (DBA).

SUMMARY

Embodiments of the invention provide methodologies for evaluating and comparing database partitioning schemes.

For example, in one embodiment, a method comprises the following steps. A database benchmark configuration is selected via an interface. At least one database partitioning scheme from a plurality of database partitioning schemes is selected via the interface. The selected database partitioning scheme is configured through the interface. The selected database partitioning scheme is evaluated based on the configuring step and the selected database benchmark configuration, and evaluation results are generated. A presentation is generated for the interface based on at least a portion of the evaluation results, wherein the presentation is configured to provide at least an indication of a performance of the selected database partitioning scheme given the configuring step and the selected database benchmark configuration.

In another embodiment, an article of manufacture is provided which comprises a processor-readable storage medium having encoded therein executable code of one or more software programs. The one or more software programs when executed by at least one processing device implement steps of the above-described method.

In a further embodiment, an apparatus comprises a memory and a processor operatively coupled to the memory and configured to perform steps of the above-described method.

Advantageously, illustrative embodiments provide a highly automated and flexible approach to conducting efficient and effective evaluation and comparison of various database partitioning schemes.

These and other features and advantages of the present invention will become more readily apparent from the accompanying drawings and the following detailed description.

DETAILED DESCRIPTION

Figure 1:
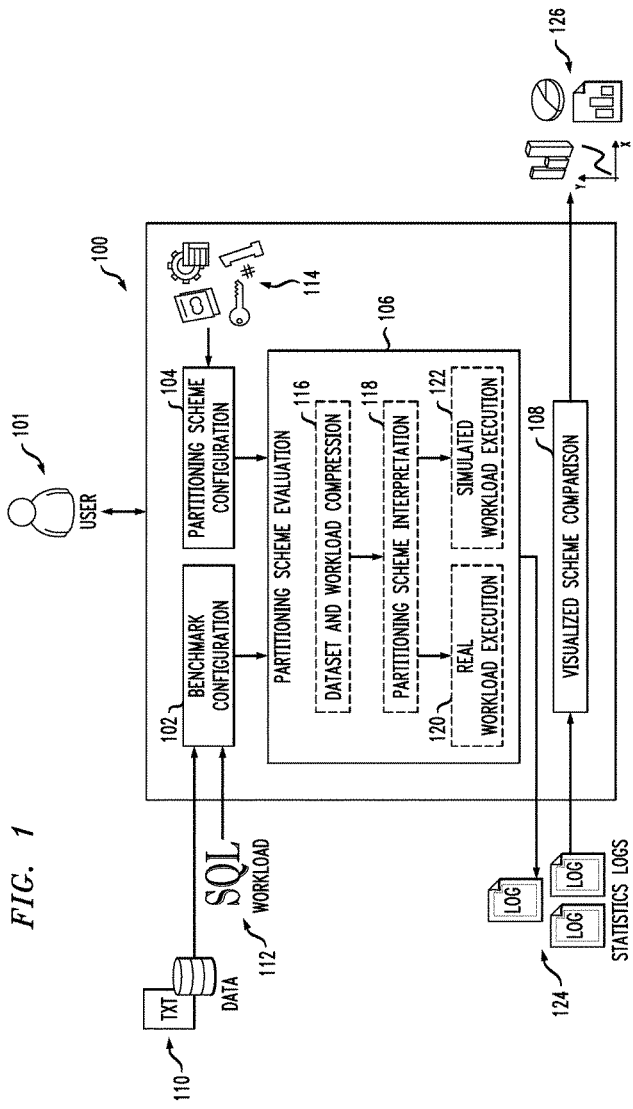
FIG. 1 shows a system and methodology for evaluating and comparing database partitioning schemes in accordance with one embodiment of the invention.

Illustrative embodiments of the invention will be described herein with reference to exemplary data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "data processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

A database administrator (DBA) typically needs to consider the following issues: partitioning key selection, data partition algorithms, data placement strategies, load balance, re-partitioning, implementation complexity, etc. The challenges for the DBA lie in the large number of alternative partitioning schemes to choose from, the uncertainty on the practical performance of each scheme, and the difficulty in efficiently comparing all feasible schemes and quickly selecting the most appropriate scheme. It is realized that without an appropriate partitioning advisory methodology and system, usually the DBA has to make a choice based on his/her past experience and/or some heuristic rules, which very possibly may result in significantly sub-optimal performance of partitioning against the target application. As such, a proper approach that can help DBAs to efficiently choose optimal partitioning schemes for their applications is desirable.

Physical design of the partitioning of a database to attain optimal performance for a given workload is a challenging task for the DBA. Without support from an automating tool, the only way a DBA can decide on the optimal physical partitioning schemes is to manually build them in the real DBMS, and then evaluate their performance. This procedure usually takes a considerable amount of time and planning, and thus is both cumbersome and expensive. Therefore, automating the physical partitioning design is realized herein to be desirable.

Automated partitioning design has been studied in literature and developed techniques have been integrated into commercial tools, such as Data Tuning Advisor (DTA) for SQL Server, Design Advisor for DB2 and SQL Access Advisor for Oracle. However, these tools have at least the following drawbacks.

First, given a dataset and a workload, these conventional tools will return to the users a single partitioning scheme that is regarded optimal, but they will not tell the users how and why this scheme was chosen. In other words, the users of these tools are excluded from the loop of decision making, and thus have no chance to affect the partitioning scheme selection procedure by expressing their own opinion and personal preferences. Moreover, the optimal partitioning scheme recommended by these tools does not come along with a detailed description and prediction on its partitioning effects.

Second, internally, such a conventional automated partitioning design tool will evaluate and compare the performance of different partitioning schemes by utilizing techniques of plan cost estimation. More specifically, the performance of a partitioning scheme for a workload is typically measured as the estimation of the total execution cost of queries in the workload, assuming that the dataset will be partitioned according to the scheme. As such, due to the inevitable inaccuracy of cost estimation, the optimality of the partitioning schemes chosen by the tool very probably cannot be guaranteed.

Third, these conventional tools will only consider a limited number of partitioning schemes that are embedded in the database management system (DBMS), and it is inconvenient or even impossible for users to compare these inbuilt partitioning schemes with other schemes.

Lastly, these conventional tools are tightly integrated with their host DBMSs and their designs are largely affected by the features and other components (e.g., query optimizer) of the DBMSs. In other words, these conventional tools are not generic and lack portability.

Illustrative embodiments are able to overcome the above and other disadvantages of the conventional partitioning design tools by providing a highly automated and flexible approach to conducting efficient and effective evaluation and comparison of various database partitioning schemes. With such an approach, different partitioning schemes can be easily configured and measured against the same database and query workload via either simulated or actual workload execution, and the evaluation results and statistic logs are vividly visualized so that the users can easily understand the practical effects of different schemes according to certain performance metrics.

Further, illustrative embodiments can thus be utilized to recommend optimal database partitioning schemes to database applications. Furthermore, illustrative embodiments can facilitate tuning the optimal configuration and parameter settings of a partitioning scheme against a database application by evaluating and comparing a specific scheme under different settings. In a convenient way, illustrative embodiments enable DBAs to choose the correct or proper partitioning schemes according to their own non-technical requirements and preferences.

Still further, illustrative embodiments can be implemented as application middleware connectable to various database systems, or can be tightly integrated into a specific database system after customizations by the database vendor.

In one embodiment, a methodology for evaluating and comparing database partitioning schemes executes as follows. Initially, the user (or some other system or source) provides an input dataset and workload, and indicates the partitioning schemes to be evaluated and compared. The dataset, workload and partitioning schemes are then evaluated to generate evaluation results and statistic logs, which in turn are used to depict figures of different formats for the exhibition and comparison of the effects of partitioning schemes.

FIG. 1 shows a system and methodology for evaluating and comparing database partitioning schemes in accordance with one embodiment of the invention. As shown in system 100 in FIG. 1, the above-described execution workflow comprises four consecutive phases: a benchmark configuration phase 102, a partitioning scheme configuration phase 104, a partitioning scheme evaluation phase 106, and a visualized scheme comparison phase 108. In the following, we describe these phases in detail.

Benchmark configuration phase 102. The dataset source 110 can, for example, be a database instance or simply plain text files, both of which should include the database schema information. The workload 112, in one embodiment, is a trace of Structure Query Language (SQL) statements. Both analytical and transactional workloads can be handled. The user 101 (e.g., a DBS or some system configured to act as a DBA) can configure the size of the dataset used in the benchmark and the underlying database system running the workload. Moreover, if the database system in the assumption is distributed, the number of nodes in the system can also be configured.

Partitioning scheme configuration phase 104. This phase imports the partitioning schemes under evaluation 114. In this embodiment, several common partitioning schemes are prepared in advance such as, but not limited to, round-robin, range, hashing and consistent hashing, as well as one or more user-defined schemes. For convenience, we define the following functional interfaces for each user-defined scheme being plugged to instantiate:

an interface for choosing partitioning keys;
an interface for partitioning and distributing data;
an interface for routing queries; and
an interface for re-partitioning the database when the number of nodes of a non-centralized system changes.

Partitioning scheme evaluation phase 106. This phase generates evaluation results and statistic logs of partitioning schemes, that will subsequently be visualized, via either the real (actual) execution 120 of the workload or a simulated execution 122.

The real execution 120 takes place in the real database system environment (not expressly shown), and will be invoked when either the input dataset and workload are small enough or they can be efficiently and meaningfully compressed, and when there are not many partitioning schemes to compare. In this case, the real execution is able to generate accurate statistics in a short time period. Otherwise, the system employs a lightweight execution simulation 122 which does not physically execute the workload and hence can run faster without significantly damaging the quality of derived evaluation results and statistics.

As shown in FIG. 1, before proceeding to the (real or simulated) workload execution, this phase first goes through two steps: dataset and workload compression 116 and partitioning scheme interpretation 118. The compression step 116 takes place in the case of real workload execution. As will be explained below, the interpretation step 118 is a preprocessing step before the workload execution.

Dataset and workload compression 116. The databases that modern database management systems (DBMSs) store and manage are becoming larger and larger. DBAs often gather a workload by using server tracing tools, which log statements that execute on the server over a representative window of time. Therefore, in the context herein, both the dataset and workload that are provided by the user 101 can be large, and therefore techniques for compressing large datasets and workloads before the real workload execution become desirable. A constraint on such compression is to ensure that evaluating the compressed dataset and workload leads to results with approximately the same quality as the results obtained by evaluating the original dataset and workload.

For dataset compression, in one embodiment, the system may utilize the UpSizeR techniques as described in Y. C. Tay et al., "UpSizeR: Synthetically Scaling an Empirical Relational Database," Technical Report TR12/10, National University of Singapore, 2013, which take as input an empirical relational dataset D and a scale factor s (<1 in the context herein), and generates a sampled dataset D' that is similar to D but s times smaller in size. It is to be appreciated that alternative dataset compression techniques can be used.

For workload compression, in one embodiment, the system may utilize the compression technique of S. Chaudhuri et al., "Compressing SQL Workloads," SIGMOD, 2004, which exploits the inherent templatization in the workload by partitioning the workload based on the signature of each query, and then picks a subset from each partition using a clustering based method. It is to be appreciated that alternative workload compression techniques can be used.

Partitioning scheme interpretation 118. After the dataset and workload compression (performed for real workload execution), the system interprets each specified partitioning scheme so as to learn how to partition and distribute the input dataset according to this scheme.

In one embodiment, the interpretation of a partitioning scheme produces three types of information:
decision on whether a specific table will be replicated or partitioned, as well as the associated partition key which is a set of attributes of the table;
a lookup table, which records to which data node a specific tuple is distributed, and which is used for query routing; and
the corresponding metadata and statistics information on the underlying database partitioning, which facilitates query optimization.

Real workload execution 120. In this case, for each partitioning scheme, the partitioned dataset is actually loaded into a particular DBMS. The associated metadata and statistics information on the partitioned dataset is also inserted into the system catalog of the DBMS, and a query optimizer is extended to search the lookup table during query optimization. The lookup table is searched for determining to which data nodes a (partial) query statement will be sent for its localized execution. Finally, the DBMS optimizes and executes each statement of the workload against the dataset, and then collects the query results and statistics.

Figure 2:
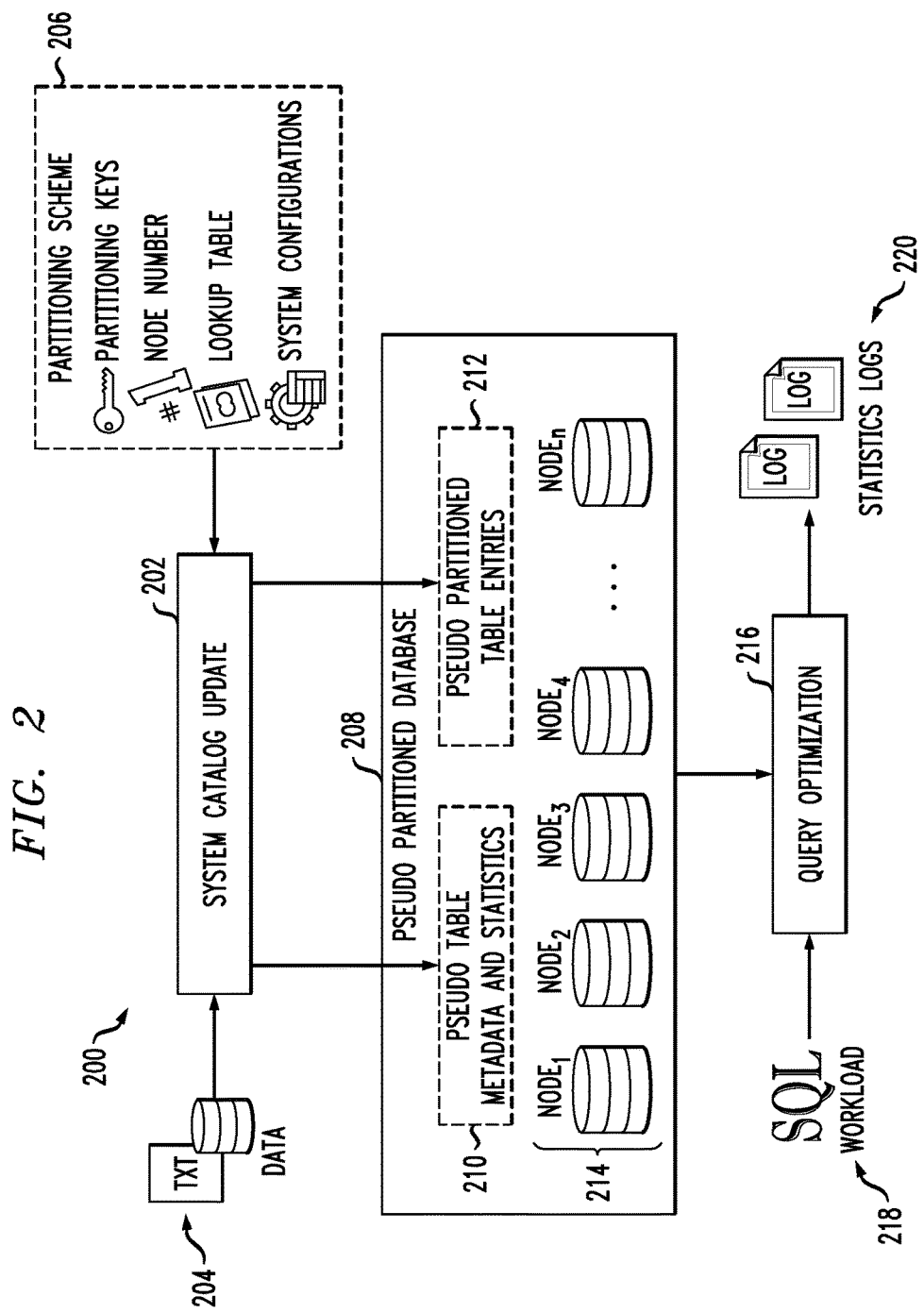
FIG. 2 shows a simulated workload execution in accordance with one embodiment of the invention.

Simulated workload execution 122. In this case, the dataset is not loaded into the underlying DBMS. As shown in simulated workload execution environment 200 in FIG. 2, a system catalog update 202 receives as input the dataset source 204 and the partitioning scheme 206 (e.g., including partitioning keys, node number, lookup table, and DBMS configuration parameters) being simulated. The metadata and statistics information on the virtually partitioned tables is inserted into the system catalog 202 and query optimizer 216 is effectively tricked into believing that these tables/entries (210 and 212, respectively) really exist in the DBMS with data on a disk, i.e., distributed on nodes 214 of a pseudo partitioned database 208. Then, the query optimizer 216 generates the optimal execution plan and estimates the plan cost for each query statement in the workload 218. These results are output as statistics logs 220.

In so doing, the evaluation and comparison system 100 is able to obtain an estimation of the total cost of executing the workload against the dataset that is not actually partitioned and stored in the DBMS. Such a simulation of workload execution can be relatively fast as compared to real execution. However, depending on the optimization quality of the query optimizer, the resultant query results and statistics may not be as accurate as those of the real workload execution.

Visualized scheme comparison phase 108. This phase parses and visualizes the execution results and statistic logs 124 resulting from the scheme evaluation phase 106 in the following several forms, for example:
figures that describe the performance of a scheme with a particular setting;
figures that compare the performance of a specific scheme with different settings; and
figures that compare the performance of different schemes according to the same setting.

Figure 3:
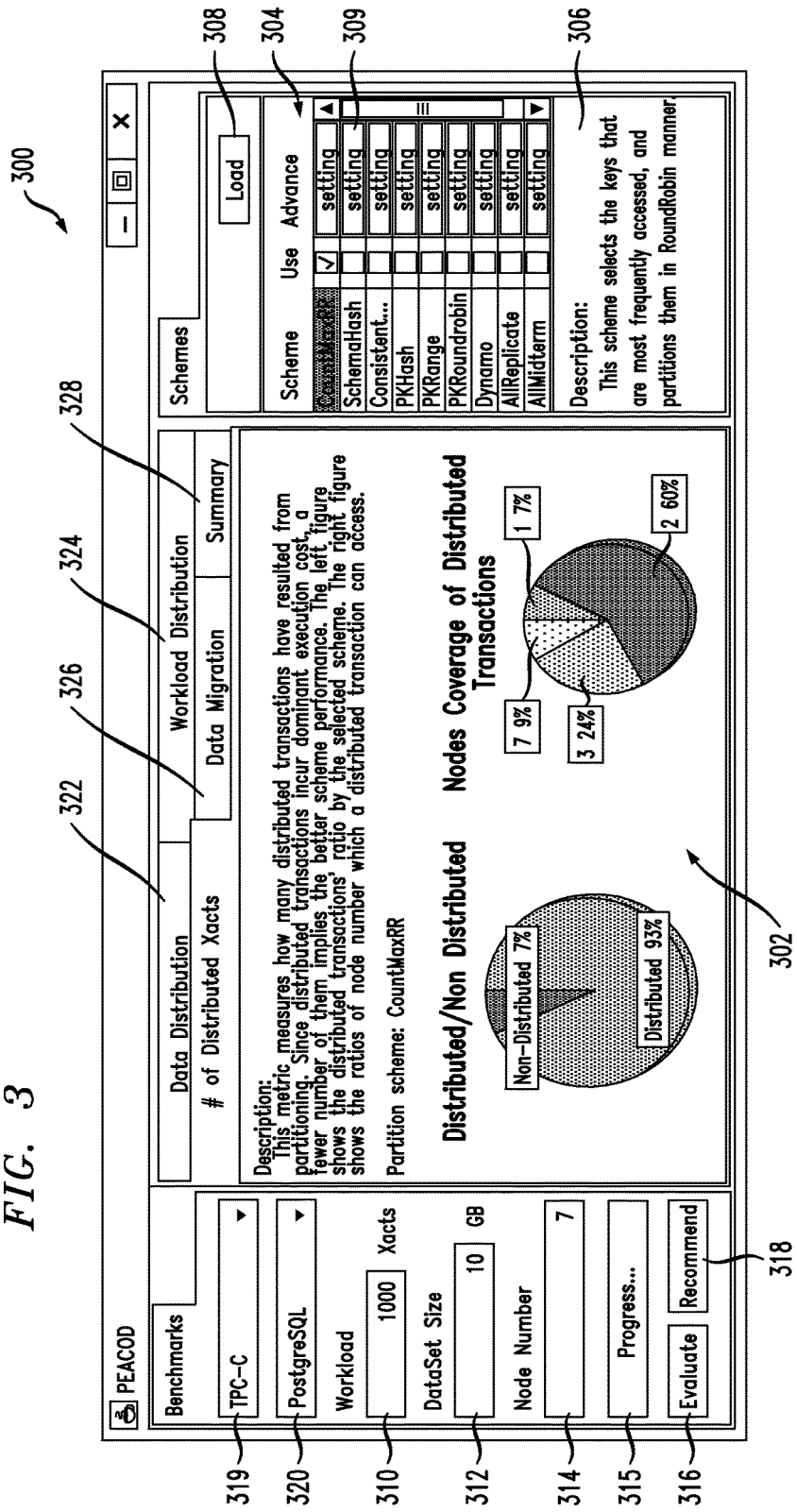
FIG. 3 shows a graphical user interface for evaluating and comparing database partitioning schemes in accordance with one embodiment of the invention.

FIG. 3 shows a graphical user interface (GUI) 300 in which one or more of these figures may be presented to the user. The term "figure" as used here with respect to what is displayed to the user can include, but is not limited to, text, graphics, audio, any other rendering or visualization of information. The user 101 can see descriptive evaluation representations of a single scheme. The user can modify (e.g., selection using one or more pointing devices, e.g., mouse, trackpad, touchscreen, etc. in conjunction with the GUI) the settings of a scheme and view the effect of this change. This functionality can facilitate partitioning scheme parameter tuning. The user can also compare different partitioning schemes based on the present figures so as to rank the partitioning schemes on their own. Furthermore, upon request of the user, a candidate scheme based on the performance metrics (and possibly ranked by the user) can be recommended to an application or some other system.

For example, as shown in GUI 300 in FIG. 3, presentation area 302 illustrates results of a performance metric executed by the system 100 that measures how many distributed database transactions ("Xacts") have resulted from partitioning according to the selected partitioning scheme. As explained in the presentation area 302, since distributed transactions incur dominant execution cost, a fewer number of them implies the better scheme performance. The left (pie chart) figure shows the distributed transactions ratio by the selected scheme, while the right (pie chart) figure shows the ratios of node number which a distributed transaction can access. In GUI 300, it is assumed that the user selected a CountMaxRR partition scheme. Selection of a plurality of partitioning schemes can be made in selection area 304 of GUI 300, whereby a description of the selected scheme is given in area 306, and the selected scheme can be loaded by selecting load button 308 and advance settings (e.g., scheme parameter settings) can be selected and set using the corresponding setting button 309 for a given scheme.

Further controls are available on the left side of GUI 300 including workload size selection 310, dataset size selection 312, distributed node number 314, progress selection 315 (provides indication of the progress of the partitioning scheme evaluation phase), evaluate button 316 (initiates evaluation of the selected scheme), recommend button 318 (after evaluation and/or comparison, a partitioning scheme can be recommended as mentioned above), benchmark selection 319 (e.g., TPC-C from the Transaction Processing Performance Council), DBMS selection 320 (e.g., PostgreSQL). Other presentation areas of GUI 300 (not expressly shown) can be selected by the user via tabs 322 (data distribution), 324 (workload distribution), 326 (data migration) and 328 (summary, which shows how the selected partitioning scheme will partition and distribute the selected benchmark data set over the cluster nodes). Additional figures generated by system 100 can be displayed in these additional presentation areas.

Figure 4:
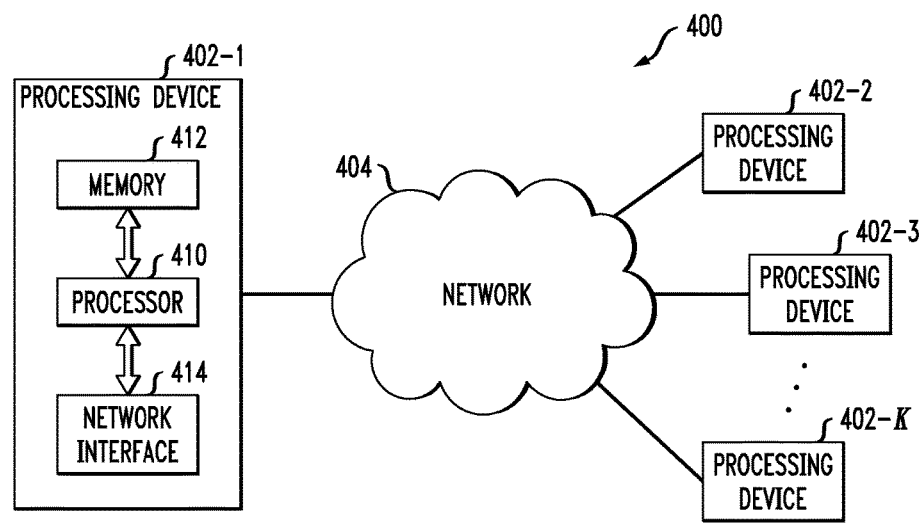
FIG. 4 shows processing infrastructure on which a database partitioning scheme evaluation and comparison system and methodologies are implemented in accordance with one embodiment of the invention.

An example of a processing platform on which a system and methodology for evaluating and comparing database partitioning schemes may be implemented is data processing platform 400 shown in FIG. 4. The processing platform 400 in this embodiment comprises a plurality of processing devices, denoted 402-1, 402-2, 402-3, . . . 402-K, which communicate with one another over a network 404. One or more of the processing devices 402 may implement components/steps of the system and methodology shown in FIGS. 1-3. It is to be appreciated that a server, a client device, a computing device or any other processing platform element may be viewed as an example of what is more generally referred to herein as a "processing device." As illustrated in FIG. 4, such a device generally comprises at least one processor and an associated memory, and implements one or more functional modules for instantiating and/or controlling features of systems and methodologies described herein. Multiple elements or modules may be implemented by a single processing device in a given embodiment.

The processing device 402-1 in the processing platform 400 comprises a processor 410 coupled to a memory 412. The processor 410 may comprise a microprocessor, a microcontroller, an application-specific integrated circuit (ASIC), a field programmable gate array (FPGA) or other type of processing circuitry, as well as portions or combinations of such circuitry elements. Components of a computing system as disclosed herein can be implemented at least in part in the form of one or more software programs stored in memory and executed by a processor of a processing device such as processor 410. Memory 412 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 412 may comprise electronic memory such as random access memory (RAM), read-only memory (ROM) or other types of memory, in any combination. The one or more software programs when executed by a processing device such as the processing device 402-1 causes the device to perform functions associated with one or more of the components/steps of the systems/methodologies described herein. One skilled in the art would be readily able to implement such software given the teachings provided herein. Other examples of processor-readable storage media embodying embodiments of the invention may include, for example, optical or magnetic disks.

Processing device 402-1 also includes network interface circuitry 414, which is used to interface the device with the network 404 and other system components. Such circuitry may comprise conventional transceivers of a type well known in the art.

The other processing devices 402 of the processing platform 400 are assumed to be configured in a manner similar to that shown for computing device 402-1 in the figure.

The processing platform 400 shown in FIG. 4 may comprise additional known components such as batch processing systems, parallel processing systems, physical machines, virtual machines, virtual switches, storage volumes, etc. Again, the particular processing platform shown in the figure is presented by way of example only, and system 400 may include additional or alternative processing platforms, as well as numerous distinct processing platforms in any combination.

Also, numerous other arrangements of servers, clients, computers, storage devices or other components are possible in system 400. Such components can communicate with other elements of the system 400 over any type of network, such as a wide area network (WAN), a local area network (LAN), a satellite network, a telephone or cable network, or various portions or combinations of these and other types of networks.

Furthermore, it is to be appreciated that the processing platform 400 of FIG. 4 can comprise virtual machines (VMs) implemented using a hypervisor. A hypervisor is an example of what is more generally referred to herein as "virtualization infrastructure." The hypervisor runs on physical infrastructure. As such, the database partitioning evaluation and comparison techniques illustratively described herein can be provided in accordance with one or more cloud services. The cloud services thus run on respective ones of the virtual machines under the control of the hypervisor. Processing platform 400 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 400 in one or more embodiments of the invention is the VMware vSphere® (VMware Inc. of Palo Alto, Calif.) which may have an associated virtual infrastructure management system such as the VMware vCenter®. The underlying physical infrastructure may comprise one or more distributed processing platforms that include storage products such as VNX® and Symmetrix VMAX®, both commercially available from EMC Corporation of Hopkinton, Mass. A variety of other computing and storage products may be utilized to implement the one or more cloud services that provide the functionality and features described herein.

One or more embodiments have the following major advantages over previous approaches.

First, a system according to one or more embodiments can aid in the challenging task of database partitioning design by generating recommendations that use feedback about the user's preferences. With the system, the users can easily configure and measure various partitioning schemes in an automatic and extendible way. Importantly, the system makes clear to the users the entire lifecycle of the scheme evaluation and comparison, and the users can interact with the system by passing their indirect domain knowledge to the partitioning schemes. In this fashion, the system offers a unique combination of very desirable features: the DBA retains total control over the performance-critical decisions to select partitioning schemes; and the feedback mechanism couples human expertise with the computational power of an automated scheme evaluator to enable an iterative approach to partitioning tuning.

Second, a system according to one or more embodiments evaluates the performance of a partitioning scheme via real workload execution whenever possible. The efficiency of the real workload execution is achieved through dataset and workload compression. Compared with the conventional cost-estimation based scheme evaluation methods, the approach described herein in accordance with one or more embodiments provides higher evaluation quality.

Third, a system according to one or more embodiments has a visualized scheme comparison component, with which the scheme evaluation results and statistics logs can be vividly visualized to help the users to fully understand the practical effects of different schemes according to certain performance metrics. The visuals depicted by the system not only compare different schemes, but also compare the same scheme with different settings. Therefore, the system can be utilized for partitioning scheme recommendation as well as partitioning scheme parameter tuning.

Fourth, the approach described herein in accordance with one or more embodiments is highly modularized and customizable, in the sense that components are replaceable without affecting each other. In one or more embodiments, it is designed as an application that is independent of the underlying DBMS and the types of target workloads. In the meantime, it can also be built into a certain DBMS as a plug-in after customization by the database vendor.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A computer-implemented method comprising:
   selecting, via a graphical user interface, a database benchmark configuration of a database management system, wherein selecting the database benchmark configuration further comprises configuring: a size of a dataset; a workload to be used in the evaluation; and a number of distributed nodes in the database management system;
   selecting, via the graphical user interface, at least one database partitioning scheme from a plurality of database partitioning schemes for the database management system;
   configuring the selected database partitioning scheme through the graphical user interface comprising selectable features to: select one or more partitioning keys; partition and distribute data; route one or more queries; and re-partition the database in response to a change to the number of distributed nodes of the database;
   evaluating the selected database partitioning scheme based on the configuring step and the selected database benchmark configuration, and generating evaluation results, wherein the evaluating step further comprises:
      applying the selected database partitioning scheme to perform one of a real workload execution and a simulated workload execution; and
      obtaining a performance metric resulting from the application of the selected database partitioning scheme to one of the real workload execution and the simulated workload execution; and
   generating a presentation for the graphical user interface based on at least a portion of the evaluation results, wherein the presentation is configured to provide at least an indication of a performance of the selected database partitioning scheme given the configuring step and the selected database benchmark configuration;
   wherein the above steps are executed in accordance with one or more processing devices, and wherein the graphical user interface is rendered via the one or more processing devices.

2. The method of claim 1, wherein selecting the database partitioning scheme further comprises importing a given configuration for the database partitioning scheme.

3. The method of claim 1, wherein evaluating the selected database partitioning scheme further comprises interpreting the selected database partitioning scheme.

4. The method of claim 3, wherein interpreting the selected database partitioning scheme further comprises determining whether and how one or more data structures are partitioned for the evaluation.

5. The method of claim 3, wherein interpreting the selected database partitioning scheme further comprises generating a lookup table which records to which node of the distributed nodes specific data is distributed.

6. The method of claim 3, wherein interpreting the selected database partitioning scheme further comprises generating at least one of metadata and statistics on the dataset.

7. The method of claim 3, wherein evaluating the selected database partitioning scheme further comprises performing the real workload execution by loading the dataset into the database management system.

8. The method of claim 7, wherein evaluating the selected database partitioning scheme further comprises compressing at least one of the dataset and the workload prior to performing the real workload execution.

9. The method of claim 3, wherein evaluating the selected database partitioning scheme further comprises performing the simulated workload execution by loading at least one of metadata and statistics on the dataset into the database management system rather than the dataset itself.

10. The method of claim 9, wherein performing the simulated workload execution further comprises using a query optimizer to generate an execution plan and estimate a plan cost for each query statement in the workload.

11. The method of claim 1, wherein generating the presentation on the graphical user interface further comprises visually presenting one or more descriptive evaluation representations regarding the selected database partitioning scheme.

12. The method of claim 1, further comprising selecting, configuring and evaluating another database partitioning scheme.

13. The method of claim 12, wherein generating the presentation on the graphical user interface based further comprises visually presenting one or more descriptive evaluation representations regarding a comparison between the selected database partitioning scheme and the other selected database partitioning scheme.

14. The method of claim 13, wherein the comparison is based on the same settings for the selected database partitioning scheme and the other selected database partitioning scheme.

15. The method of claim 13, wherein the comparison is based on different settings for the selected database partitioning scheme and the other selected database partitioning scheme.

16. An article of manufacture comprising a processor-readable storage medium having encoded therein executable code of one or more software programs, wherein the one or more software programs when executed by at least one processing device implement the steps of:
   selecting, via a graphical user interface, a database benchmark configuration of a database management system, wherein selecting the database benchmark configuration further comprises configuring: a size of a dataset; a workload to be used in the evaluation; and a number of distributed nodes in the database;
   selecting, via the graphical user interface, at least one database partitioning scheme from a plurality of database partitioning schemes for the database management system;
   configuring the selected database partitioning scheme through the graphical user interface comprising selectable features to: select one or more partitioning keys; partition and distribute data; route one or more queries; and re-partition the database in response to a change to the number of distributed nodes of the database;
   evaluating the selected database partitioning scheme based on the configuring step and the selected database benchmark configuration, and generating evaluation results, wherein the evaluating step further comprises:
      applying the selected database partitioning scheme to perform one of a real workload execution and a simulated workload execution; and
      obtaining a performance metric resulting from the application of the selected database partitioning scheme to one of the real workload execution and the simulated workload execution; and
   generating a presentation for the graphical user interface based on at least a portion of the evaluation results, wherein the presentation is configured to provide at least an indication of a performance of the selected database partitioning scheme given the configuring step and the selected database benchmark configuration.

17. The article of claim 16, wherein evaluating the selected database partitioning scheme further comprises interpreting the selected database partitioning scheme, and wherein interpreting the selected database partitioning schemes comprises performing one or more of:
   determining whether and how one or more data structures are partitioned for the evaluation;
   generating a lookup table which records to which node of the distributed nodes specific data is distributed; and
   generating at least one of metadata and statistics on the dataset.

18. The article of claim 17, wherein evaluating the selected database partitioning scheme further comprises performing at least one of the real workload execution by loading the dataset into the database management system and the simulated workload execution by loading at least one of metadata and statistics on the dataset into the database management system rather than the dataset itself.

19. An apparatus comprising:
   a memory; and
   a processor operatively coupled to the memory and configured to:
   select, via a graphical user interface, a database benchmark configuration of a database management system, wherein the selecting of the database benchmark configuration further comprises a configuration of: a size of a dataset; a workload to be used in the evaluation; and a number of distributed nodes in the database;
   select, via the graphical user interface, at least one database partitioning scheme from a plurality of database partitioning schemes for the database management system;
   configure the selected database partitioning scheme through the graphical user interface comprising selectable features to: select one or more partitioning keys; partition and distribute data; route one or more queries; and re-partition the database in response to a change to the number of distributed nodes of the database;
   evaluate the selected database partitioning scheme based on the configuring step and the selected database benchmark configuration, and generating evaluation results, wherein, in evaluating the selected database partitioning scheme, the processor is further configured to:
      apply the selected database partitioning scheme to perform one of a real workload execution and a simulated workload execution; and
      obtain a performance metric resulting from the application of the selected database partitioning scheme to one of the real workload execution and the simulated workload execution; and
   generate a presentation for the graphical user interface based on at least a portion of the evaluation results, wherein the presentation is configured to provide at least an indication of a performance of the selected database partitioning scheme given the configuring step and the selected database benchmark configuration.

* * * * *